(12) United States Patent
Andolina (10) Patent No.: US 8,803,814 B2
(45) Date of Patent: Aug. 12, 2014

(54) SURFACE SCANNING WITH A CAPACITIVE TOUCH SCREEN

(75) Inventor: Joe Andolina, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 965 days.

(21) Appl. No.: 12/404,072

(22) Filed: Mar. 13, 2009

(65) Prior Publication Data

US 2013/0194192 A1    Aug. 1, 2013

(51) Int. Cl.
*G06F 3/041*    (2006.01)

(52) U.S. Cl.
USPC .......................................................... 345/173

(58) Field of Classification Search
None
See application file for complete search history.

(56) References Cited

U.S. PATENT DOCUMENTS

| | | | |
|---|---|---|---|
| 6,168,080 B1 * | 1/2001 | Verschuur et al. | 235/462.01 |
| 6,943,705 B1 * | 9/2005 | Bolender et al. | 341/33 |
| 8,154,428 B2 * | 4/2012 | Do et al. | 341/20 |
| 2001/0020935 A1 * | 9/2001 | Gelbman | 345/173 |
| 2002/0024507 A1 * | 2/2002 | Boone et al. | 345/173 |
| 2006/0138233 A1 * | 6/2006 | Kemppainen et al. | 235/451 |
| 2006/0294247 A1 * | 12/2006 | Hinckley et al. | 709/228 |
| 2008/0105746 A1 * | 5/2008 | Lei | 235/462.11 |
| 2010/0138304 A1 * | 6/2010 | Boyarsky et al. | 705/14.65 |
| 2010/0163613 A1 * | 7/2010 | Bucher et al. | 235/375 |
| 2013/0194202 A1 * | 8/2013 | Moberg et al. | 345/173 |

* cited by examiner

*Primary Examiner* — Joseph Haley
*Assistant Examiner* — Emily Frank
(74) *Attorney, Agent, or Firm* — Kilpatrick Townsend & Stockton LLP (57) ABSTRACT

A scanning capability for capacitive touch screen devices is disclosed. Images, such as text, barcodes, or the like are printed on printed objects, such as business cards, information cards, and the like using electrically conductive ink that has had electrical properties imparted thereon such that, when the printed object comes in contact with the touch screen of a capacitive touch screen device, the imparted electrical properties are sufficient to cause variances in capacitance to the touch screen that are detectable by the device. Using these detected touches, the scanning system analyzes any patterns created by the detected touches to determine information represented by those patterns and corresponding to the information represented by the images printed on the printed object.

25 Claims, 5 Drawing Sheets

SURFACE SCANNING WITH A CAPACITIVE TOUCH SCREEN

TECHNICAL FIELD

The presently disclosed teachings relate, in general, to surface scanning and, more particularly, to surface scanning with a capacitive touch screen.

BACKGROUND

Information processing provides the underlying foundation of most modern enterprises. Whether it is managing a school, managing inventory, conducting sales, or the like, the information (e.g., student information, class schedule information, inventory stock, item identifications, price information, and the like) is key to maintaining operation of the enterprise. Before the advent of accessible computers, most such information processing was performed by hand, using paper files, indices, and the like. However, because computers are especially useful in the processing of information, their application to such uses have become common place. Computers manage school information, such as enrollment, student names and information, class schedules, assigned teachers, and the like; inventory information, such as item identification, numbers in inventor, dates of acquisition and disposition, and the like; sales information, such as price, quantity in stock, purchaser information, and the like. One technology which has greatly advanced the efficiency of such information processing is information scanning.

Information scanning may be accomplished through a variety of methods, such as optical scanning of documents, which are then processed through image and character recognition applications to interpret the images as actual coded text. This process, referred to generally as optical character recognition (OCR), has allowed paper documents to be digitized into computer accessible and operable information. Barcodes have also provided a great leap in efficiency in all manner of operations. Laser barcode scanners have been used in grocery stores for years in order to read the universal product code (UPC) barcode placed on each item in the store. After decoding the barcode, the underlying computers know what product is being purchased and the current price that the product is being sold for. Barcodes are now also used to identify individuals, such as patients in a hospital where a barcode containing their admission information is printed on a wrist band; tickets, whether they are tickets printed on a home printer for a concert or ball game, or plane tickets, printed on a home printer or an airport kiosk; or the like. Using a laser barcode scanner, these barcodes may be scanned and their authenticity verified by the underlying computer system. Thus, the management of such information has become extremely efficient and accurate.

In order to actually read such barcodes, some type of scanning device or interface is used. For example, laser scanners are typically used to direct a laser beam over the barcode and, through reflection of the laser light waves, determine the light and dark portions of the code. The determined pattern may then be translated into the information represented in the barcode. Optical-based scanners, such as implemented using lens-based cameras, charged coupled device (CCD) electronics, and the like, are also often used to actually capture the image of the text or barcode and image processing algorithms are used to decipher the image, whether into a recognizable character or barcode. Without a scanning device, however, the benefits of such computerized information processing is unavailable. Computers would still be able to perform the information processing, but the entry of the information would be through a manual entry procedure such as a keyboard, keypad, or the like, wherein the user will manually type in the code or information that will be managed by the computer.

BRIEF SUMMARY

The present teachings are directed to implementing a scanning process on capacitive touch screen devices. Images, such as text, barcodes, or the like are printed on printed objects, such as business cards, information cards, and the like using electrically conductive ink that has had electrical properties imparted thereon such that, when the printed objects touch the touch screen of a capacitive touch screen device, the imparted electrical properties are sufficient to cause variances in capacitance to the touch screen that are detectable by the device. Using these detected touches, the scanning system analyzes any patterns created by the detected touches to determine information represented by those patterns and corresponding to the information represented by the images printed on the printed object.

Representative embodiments of the present teachings are related to computer implemented methods that include detecting one or more variances in capacitance on a capacitive touch screen when a printed object comes in contact with the capacitive touch screen. The printed object is made up of one or more images printed with electrically conductive ink onto a non-conducting substrate. Moreover, the capacitance variances are caused by electrical properties imparted onto the electrically conductive ink. The methods further include determining one or more locations of the variances in capacitance, those locations corresponding to one or more touch points of the images on the capacitive touch screen, and analyzing a pattern in the determined locations, wherein the pattern corresponds to information represented by the images.

Additional representative embodiments of the present teachings are directed to computer implemented systems made up of a processor, storage memory coupled to the processor, a capacitive touch panel coupled to the processor and the storage memory, and a scanning application stored in the storage memory. When executed by the processor, the scanning application creates a scanning environment that includes a touch location module configure to receive one or more detected touch points caused by a printed object coming in contact with the capacitive touch panel, wherein one or more images printed onto a non-conducting substrate of the printed object have electrical properties that cause capacitance variations detectable by the capacitive touch panel as the one or more detected touch points, and a pattern analysis module configured to analyze a pattern from the detected touch points to determine the information represented by the images printed on the printed object.

Still further representative embodiments of the present teachings are directed to computer program products having computer readable media with computer program logic recorded thereon. The computer program product includes code for detecting one or more variances in capacitance on a capacitive touch screen when a printed object comes in contact with the capacitive touch screen, wherein the capacitance variances are caused by electrical properties imparted onto the electrically conductive ink. The printed object is made up of one or more images printed with electrically conductive ink onto a non-conducting substrate. The computer program product further includes code for determining one or more locations of the capacitance variances, where those locations correspond to one or more touch points on the capacitive touch screen where the images touch the screen, and code for analyzing a pattern in the determined locations, wherein the pattern corresponds to information represented by the printed images.

Additional representative embodiments of the present teachings are directed to computer implemented methods that include executing instructions on a computing platform so that binary digital electronic signals detect one or more variances in capacitance on the capacitive touch screen when a printed object comes in contact with the capacitive touch screen, wherein the capacitance variances are caused by electrical properties imparted onto the electrically conductive ink. The printed object comprises one or more images printed with electrically conductive ink onto a non-conductive substrate. The computer implemented methods also include executing instructions on a computing platform so that binary digital electronic signals determine one or more locations of the variances in capacitance, the one or more locations corresponding to one or more touch points of the one or more images on the capacitive touch screen, and executing instructions on a computing platform so that binary digital electronic signals analyze a pattern in the locations, wherein the pattern corresponds to information represented by those printed images.

The foregoing has outlined rather broadly the features and technical advantages of the present teachings in order that the detailed description that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the disclosure as set forth in the appended claims. The novel features which are believed to be characteristic of the teachings disclosed herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following descriptions taken in conjunction with the accompanying drawing, in which.

DETAILED DESCRIPTION

Figure 1:
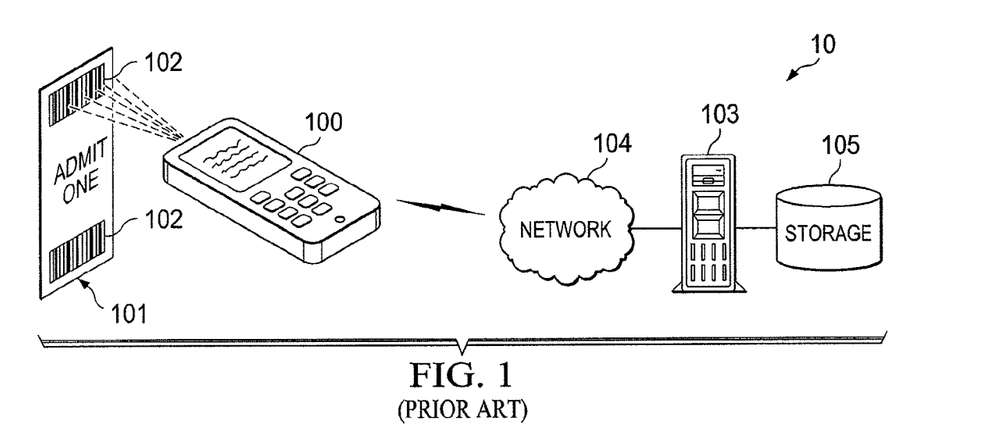
FIG. 1 is a block diagram illustrating a barcode scanning system for a typical barcode scanning process.

Early commercial barcode scanning typically used large fixed devices where the barcode and item were passed over the scanning region. As the technology developed, smaller-scaled devices were developed to increase the accessibility of barcode scanning to mobile applications. FIG. 1 is a block diagram illustrating barcode scanning system 10 for a typical barcode scanning process. A ticket taker at a particular venue uses laser scanner 100 to scan barcode 102 printed on ticket 101. Laser scanner 100 is a handheld device that scans and deciphers the code of barcode 102 and transmits that code wirelessly to backend computer system 103 over network 104. Examples of such networks may be a wide or local area networks, and the like, or may be the Internet. The code is then checked against information in a database stored in storage 105, coupled to backend computer system 103. Therefore, scanning barcode 102 may be verified as authentic or valid based on the scanning of barcode 102 by laser scanner 100 and then checked against backend information determined through backend computer system 103. During this backend check, the information stored in storage 105 may also be changed or updated based on the scanning. Laser barcode scanners, such as laser scanner 100 are well known in the art and have been manufactured on dedicated personal data assistants (PDAs) in order to increase portability. When manufactured on such portable computing devices, more processing may be performed directly on the scanner, allowing for faster transaction speeds and at whatever location the user is located.

It should be noted that laser scanning device 100 may be replaced with an optical scanning device (not shown) to perform similar scanning operation. With the optical scanning, an image of the barcode is captured and processed to determine the representative information.

While the incorporation of laser and optical scanners into PDAs has increased the flexibility and accessibility of barcode and information reading technology, it still generally requires a dedicated device that includes either a laser-enabled scanner or an optical-enabled scanner. The current trend in personal electronic devices, including advanced cell phones and smart phones, includes some type of touch screen. A touch screen is an input device which scans for user input via finger or stylus touch on the screen. It provides a user interface between the user and the computer. There are many types of touch screens. A resistive touch screen panel is composed of several layers under a pliable clear top layer. Two thin metallic electrically conductive and resistive layers separated by a thin space lie beneath the top layer. When a user uses an object to engage this kind of touch panel, the layers are connected at a certain point. The panel then electrically acts similar to two voltage dividers with connected outputs. This causes a change in the electrical current which is registered as a touch event and sent to the controller for processing.

Surface acoustic wave (SAW) touch screens use ultrasonic waves that pass over the touch screen panel. When a user touches the panel, a portion of the wave is interrupted and absorbed. This change in the ultrasonic waves registers the position of the touch event and sends this information to the controller for processing. This technology operates to implement touch screen technology, but because of the technical underpinnings of this technology, it is generally not suitable for scanning things other than panel touches.

Another touch screen technology involves optical imaging. In such optical imaging scanners, two or more image sensors are placed around the edges (often in the corners) of the screen. Infrared or similar backlights may be placed in the camera's field of view on the other sides of the screen. A touch shows up as a shadow and each of the cameras can then be triangulated to locate the touch. With a high number of optical image sensors placed on the touch panel, an optical imaging touch screen may then have sufficient resolution to capture data images such as text and barcode images.

Another growing technology being used for touch screens is capacitive coupling. Capacitive touch screens are emerging as the preferred manner to implement touch screens on mobile devices. There are generally two types of capacitive coupling-based touch screens: direct capacitance and projected capacitance. In direct capacitance touch screens, the touch screen panel is typically coated with a material, such as indium tin oxide, that conducts a continuous electrical current across the sensor. The sensor, therefore, exhibits a precisely controlled field of stored electrons in both the horizontal and vertical axes, i.e., it achieves capacitance. The human body is also an electrical device which has stored electrons and, therefore, also exhibits capacitance and conductance. Capacitive sensors work based on proximity and do not have to be directly touched to be triggered. Capacitive touch screens may also support multitouch systems, such as provided for in Apple, Inc.'s IPHONE® and ITOUCH®. In projected capacitance touch screens, relationships between a two-dimensional array of sensing wires embedded within two layers of non-metallic material and a third object is monitored. This third object may be a human finger. Capacitance forms between the user's fingers and the projected capacitance from the sensing wires. A touch of the touch panel may be precisely measured by the relationship with the two-dimensional array and then passed on to the controller system which is connected to a computer running a software application. This will then calculate how the user's touch relates to the computer software.

Figure 2:
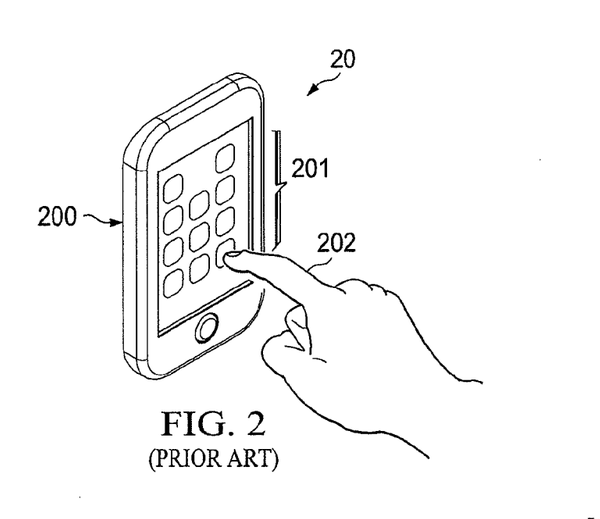
FIG. 2 is a diagram illustrating a typical capacitive touch device (CTD)

FIG. 2 is a diagram illustrating typical capacitive touch device (CTD) 20. CTD 20 provides touch panel 200 with various icons 201 displayed thereon. In order for a user to interact with CTD 20 and the applications operable through interaction with one or more of various icons 201, he or she uses finger 202 to touch touch panel 200 at desired locations to activate the desired applications or functionalities. The electrical properties of a human finger, such as finger 202, provides a connection with touch panel 200 that changes the capacitance measured at the point of the touch on touch panel 200. CTD 20 detects this change in capacitance and, using a number of sensors (not shown), pinpoints the location of the touch. Such capacitive devices, such as CTD 20, are capable of detecting multiple touches on touch panel 200. Using these located points, CTD 20 processes the application or function associated with the location of the touch or touches.

While capacitive touch screens are becoming the more popular technology for modern consumer handheld touch screen devices, they generally operate only through a finger touch. Thus, a standard stylus used for resistive touch screens will not register with a capacitive touch screen. Only styli using a particular conducting material presenting a large enough contact region are capable of registering touches on a capacitive touch screen. The conductive nature of such specialized styli conduct the electrical properties of the hand holding the stylus to the touch screen, thus, causing a detectable variance in the capacitance of the touch screen. An example of such a capacitive touch screen-compatible stylus is Ten One Design L.L.C.'s POGO™ stylus. Because of this limited means for activating a capacitive touch screen, its functionality has generally been limited to finger-based operations.

Figure 3:
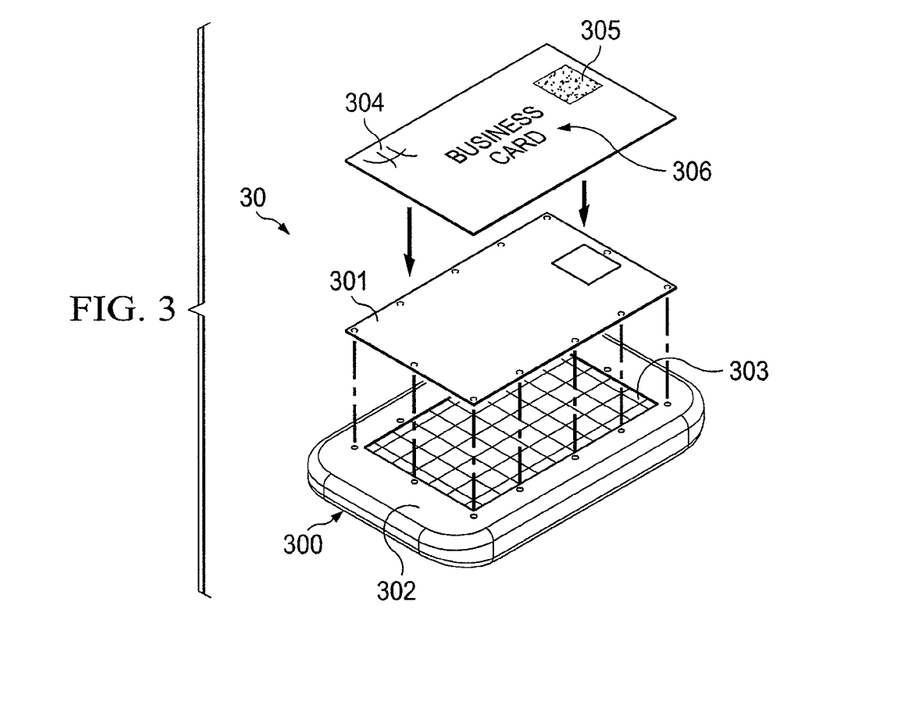
FIG. 3 is a diagram illustrating a capacitive scanning system configured according to one embodiment of the present teachings.

FIG. 3 is a diagram illustrating capacitive scanning system 30 configured according to one embodiment of the present teachings. CTD 300 is illustrated in an exploded view with touch panel 301 shown separated from the body of CTD 300. Underneath touch panel 301, sensor grid 302 includes multiple capacitance sensors positioned in a grid covering the area under touch panel 301. The sensors are located at the intersections of each line of sensor grid 302, as shown by sensor 303. The number of sensors 303 positioned on sensor grid 302 allows a very fine resolution that enables CTD 300 to detect the precise locations of the various touch or touches that occur on touch panel 301.

CTD 300 also includes a scanning software application (not shown), which reads multiple activated touches on touch panel 301 and processing the orientation and pattern of the activated touches into a corresponding image, such as the image of two-dimensional (2-D) barcode 305 and text 306 on business card 304. The images formed by the touches on touch panel 301 are then further processed into representative information. In the case of 2-D barcode 305, the barcode is further processed to decipher the corresponding information contained therein. Further, in the case of text images, such as text 306, OCR processing routines are run on the image to convert the image of text 306 into computer-compatible text.

In order for CTD 300 to actually scan the information contained on business card 304, CTD 300 is created using material that provides electrical properties on 2-D barcode 305 and text 306 which activates recognizable touches on touch panel 301. There are various different methods for creating these electrical properties on business card 304. For example, ink that has a built-in charge may be used to print business card 304, such that a particular capacitance and conductance may be established on business card 304 between the charged ink lines (capacitance) and in the charged ink lines (conductance) themselves. The application of business card 304, created using such technology, to touch panel 301 would cause sufficient enough change in the capacitance of touch panel 301 for CTD 300 to detect the locations of the touches at each of the locations that the electrically-charged ink touches touch panel 301.

It should be noted that in additional and alternative embodiments of the present teachings, the properties of the electrically-charged ink may be such that CTD 300 does not detect the locations where the ink touches touch panel 301, but instead detects the image of the "whitespace" locations between the ink portions of business card 304.

It should further be noted that various methods of imparting the appropriate electrical properties to the printed images on a printed object may be used. For example, after printing the images using conductive or magnetic ink, the printed object may be "charged" by bringing an electrically charged object over or in close proximity to the images in order to transfer charge to the ink.

Figure 4:
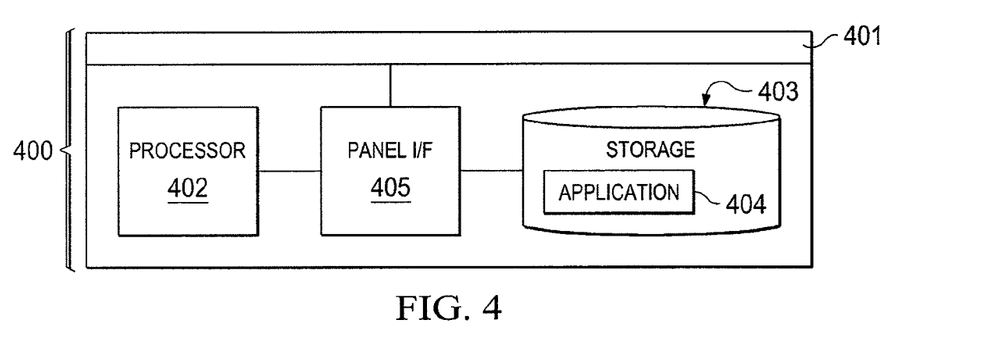
FIG. 4 is a block diagram illustrating a CTD configured according to one embodiment of the present teachings.

FIG. 4 is a block diagram illustrating CTD 400 configured according to one embodiment of the present teachings. CTD 400 comprises, among other things, touch panel 401 processor 402, storage memory 403 coupled to processor 402, and panel interface 405 coupled to both processor 402, storage memory 403, and touch panel 401. Scanning application 404 is stored on storage memory 403. When executed by processor 402, scanning application 404 creates a scanning environment, such as capacitive scanning system 30 (FIG. 3). The scanning environment interprets the various touch activations on touch panel 401 as elements to be scanned and interpreted for underlying information.

Figure 5:
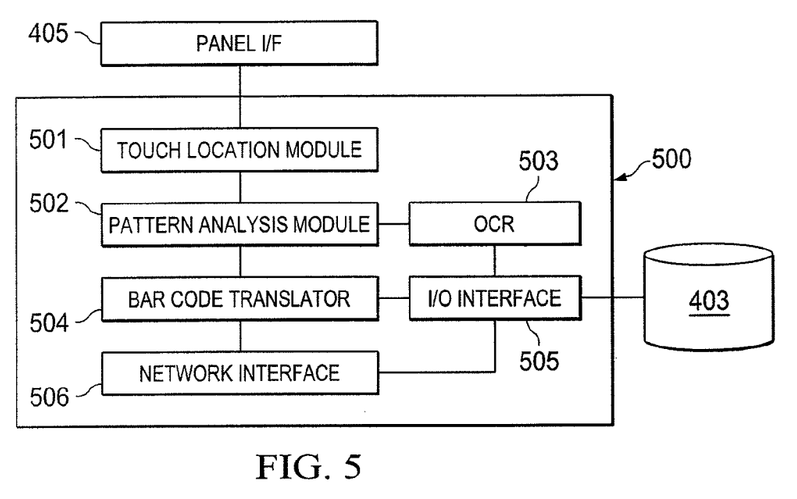
FIG. 5 is a block diagram illustrating a scanning environment configured according to one embodiment of the present teachings.

FIG. 5 is a block diagram illustrating scanning environment 500 configured according to one embodiment of the present teachings. Scanning environment 500, created on execution of scanning application 404 (FIG. 4), provides the functions and processes to conduct scanning from the surface of a capacitive touch screen device, such as CTD 400 (FIG. 4). Touch location module 501 receives the touch information from panel interface 405 (FIG. 4) and passes this information onto pattern analysis module 502. Pattern analysis module 502 analyzes the touch location information to recognize any patterns in the multiple touches. It can differentiate between barcode patterns and text or image patterns. Text or image patterns are passed to OCR module 503 for character recognition and possible conversion from image data into compatible text. Barcode patterns are passed to barcode translator 504 which associates the barcode pattern with known barcode translation information, such deciphering typical UPC codes associated with goods, and the like. The resulting information from OCR module 503 and barcode translator 504 are passed to input/output (I/O) interface 505 which stores the resulting information in storage memory 403 (FIG. 4). This information may be used by CTD 400 (FIG. 4) and rendered onto touch panel 401 (FIG. 4) for the user to see. Additionally, network interface 506 is provided to establish a connection with remote backend systems (not shown) for verification, authentication, information management, or the like on such remote back end systems. This allows for the user to scan the information locally, yet provide the scanned information or parts thereof to a broader, distributed information management system whether for personal use or business use.

Referring back to FIG. 3, business card 304 was described to use electrically charged ink that provides capacitance and/or conductance of an amount able to trigger a detectable capacitance change by sensor panel 301. However, it should be noted that additional and/or alternative embodiments of the present teachings may use any types of ink materials or ink materials in combination with substrate or paper material that creates an electrical property that is sufficient to cause a detectable capacitance change on a capacitive touch screen device.

Figure 6A:
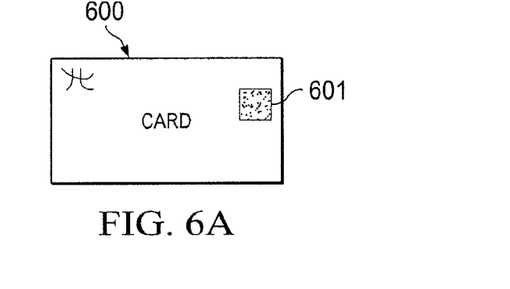
FIGS. 6A and 6B are diagrams illustrating the front and back views of a card configured to enable capacitive touch screen scanning according to one embodiment of the present teachings.
Figure 6B:
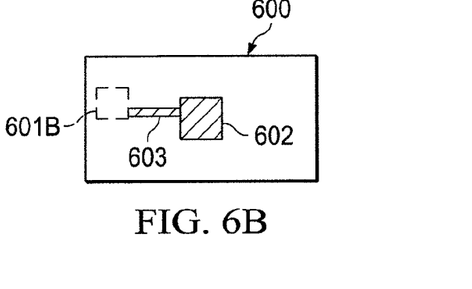

FIGS. 6A and 6B are diagrams illustrating the front and back views of card 600 configured to enable capacitive touch screen scanning according to one embodiment of the present teachings. Card 600 includes 2-D barcode 601 which contains information that the card holder desires to be available for scanning. 2-D barcode 601 is printed on card 600 using conductive ink. The conductive ink may be such that the printed 2-D barcode 601 is visible, invisible, or nearly invisible to the human eye. On the back of card 600 conducting pad 602 and conducting trace 603 are provided, which may also be printed using conductive ink that is visible, invisible, or nearly invisible to the human eye. Conducting trace 602 electrically connects conducting pad 602 to back area 601b of 2-D barcode 601. As a user desires to scan card 600 using a capacitive touch screen device, he or she places card 600 face down on the touch screen and places his or her finger on conducting pad 602. An electrical circuit is now created between the user's finger and 2-D barcode 601 on the front of card 600. This electrical connection provides the appropriate electrical properties to 2-D barcode 601 that enables detectable touches to the capacitive touch screen panel. The substrate material of card 600 is non-conductive, such that, when the user places a finger on conducting pad 602, the electrical properties of the user's finger are isolated or insulated from capacitive touch screen. Therefore, when a scanning application is run on the capacitive touch screen device, the information encoded into 2-D barcode 601 may be scanned into the device.

It should be noted that in additional and/or alternative embodiments of the present teachings, conducting pad 602 and conducing trace 603 may also provide appropriate electrical properties to any text printed with conductive ink on card 600.

Figure 7:
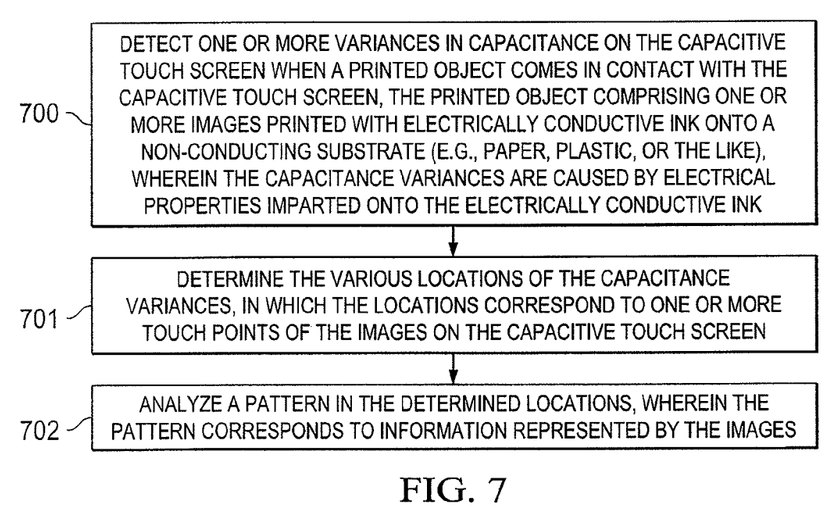
FIG. 7 is a flowchart illustrating example steps executed to implement one embodiment of the present teachings.

FIG. 7 is a flowchart illustrating example steps executed to implement one embodiment of the present teachings. In step 700, one or more variances in capacitance are detected on a capacitive touch screen when a printed object, comprising one or more images printed with electrically conductive ink onto a non-conducting substrate (e.g., paper, plastic, or the like), comes in contact with the capacitive touch screen, wherein the one or more variances are caused by electrical properties imparted onto the electrically conductive ink. In step 701, one or more locations of the one or more variances in capacitance are determined, where the one or more locations correspond to one or more touch points of the one or more images on the capacitive touch screen. A pattern, such as text images, barcodes, or the like, is analyzed in the one or more locations, in step 702, wherein the pattern corresponds to information represented by the one or more images.

Figure 8:
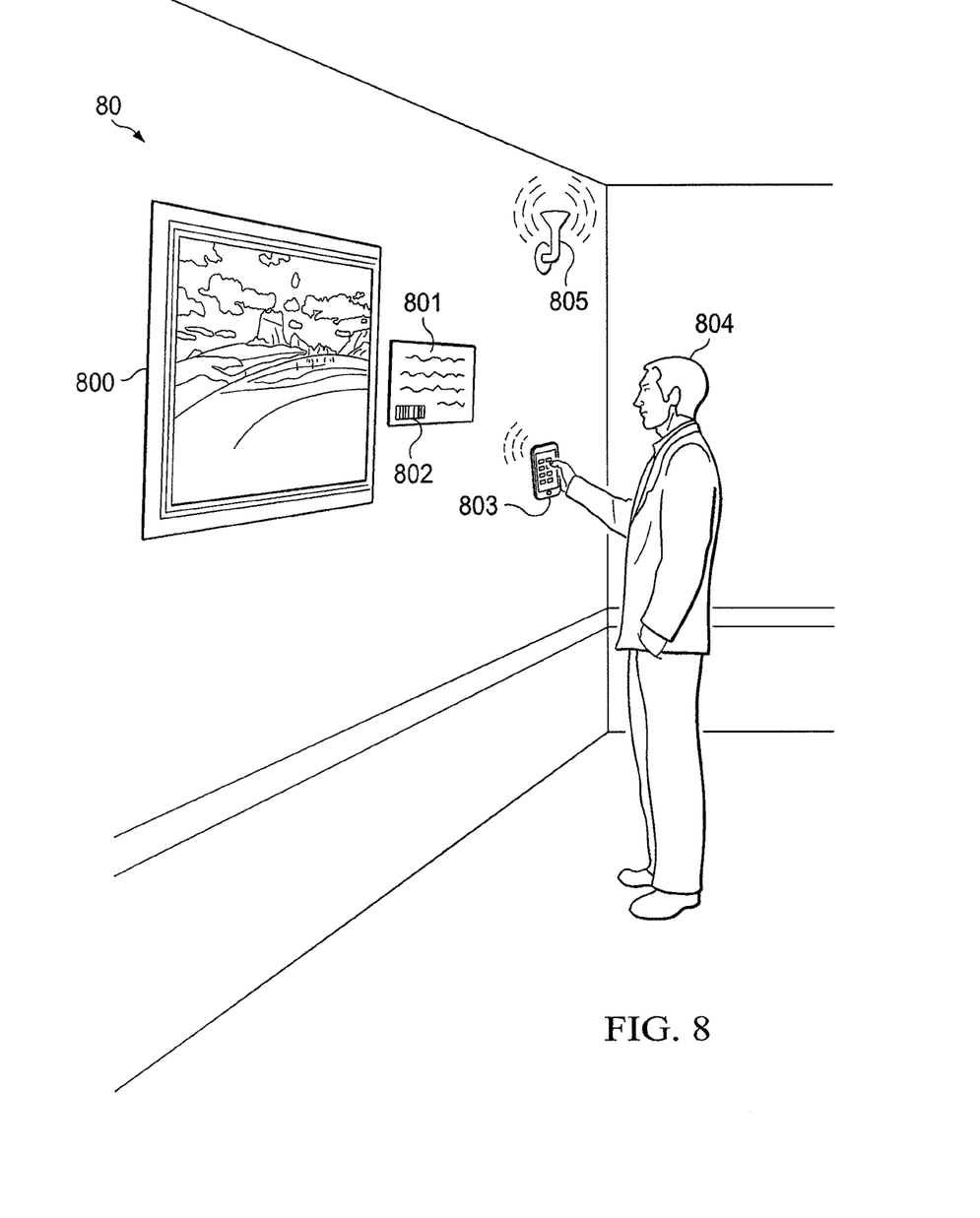
FIG. 8 is a diagram illustrating a CTD configured according to one embodiment of the present teachings.

With regard to the embodiments described in FIGS. 3 and 6, the disclosed operation included placing a printed object, such as a business card, onto the touch screen of the CTD. However, the various embodiments of the present teachings are not limited in such means for the CTD touch screen to receive the printed object. FIG. 8 is a diagram illustrating CTD 803 configured according to one embodiment of the present teachings. In example operation, museum environment 80 includes numerous works of art, such as painting 800, displayed on its walls and floors. Typically, museums will place a small placard or sign, such as placard 801, which identifies the title of the work along with the name of the artist. It will also often include a short synopsis or explanation of what the work represents. Placard 801 also includes barcode 802, which may be printed directed onto placard 801 or printed on another object that is affixed to placard 801. Barcode 802 is printed using electrically conductive ink that has been printed onto a non-conducting substrate. Instead of placing a card onto the touch screen of CTD 803, visitor 804 places CTD 803 up to placard 801 and positions the touch screen over barcode 802. The touch screen of CTD 803, thus, receives the images of barcode 802 when the touch screen is touched to that portion of placard 801.

A scanning program running on CTD 803 detects variances in capacitance on the touch screen caused by the electrical properties imparted onto the electrically conductive ink. Using the locations of these capacitance variances, touch points are determined, which correspond to the image on barcode 802, and patterns are analyzed in those touch points in order for the scanning program to recognize the barcoding on barcode 802. The recognized pattern may then be converted into its representative information using known barcode interpretation methods. Depending on the capabilities of CTD 803, this information may be used for various different purposes.

For example, the information represented by barcode 802 may be a document that gives a more detailed explanation or history about painting 800 or the artist or other such type of supplemental information. In another example of operation, the information represented by barcode 802 may also provide connection information related to an audio or audiovisual tour of museum environment 80. Using the connection information from barcode 802, CTD 803 wirelessly accesses the museum network (not shown) through wireless access point 805 and requests to download various audio or multimedia files that are identified by the connection information and associated in some fashion with painting 800. Using the speaker or headphone capability of CTD 803, visitor 804 may listen to or listen and watch such media presentations directly on CTD 803.

Embodiments, or portions thereof, may be embodied in program or code segments operable upon a processor-based system (e.g., computer system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 9:
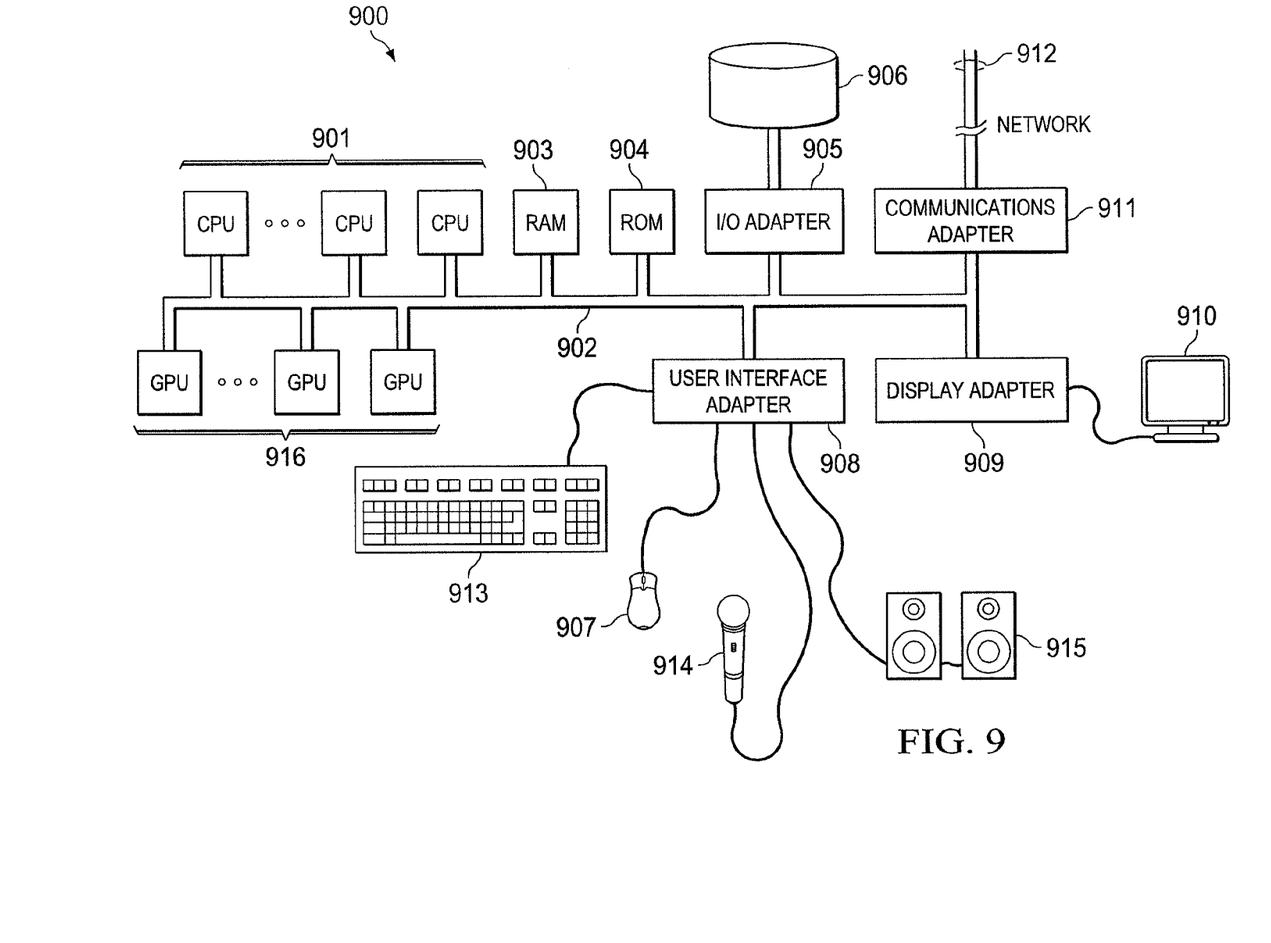
FIG. 9 illustrates an exemplary computing platform configured to implement the capacitive touch screen scanning therein according to certain embodiments.

FIG. 9 illustrates an exemplary computing platform, computer system 900, configured to implement the capacitive touch screen scanning therein according to certain embodiments. Central processing unit ("CPU" or "processor") 901 is coupled to system bus 902. CPU 901 may be any general-purpose processor. The present disclosure is not restricted by the architecture of CPU 901 (or other components of exemplary system 900) as long as CPU 901 (and other components of system 900) supports the inventive operations as described herein. As such CPU 901 may provide processing to system 900 through one or more processors or processor cores. CPU 901 may execute the various logical instructions described herein. For example, CPU 901 may execute machine-level instructions according to the exemplary operational flow described above in conjunction with FIG. 7. When executing instructions representative of the operational steps illustrated in FIG. 7, CPU 901 becomes a special-purpose processor of a special purpose computing platform configured specifically to operate according to the various embodiments of the teachings described herein.

Computer system 900 also includes random access memory (RAM) 903, which may be SRAM, DRAM, SDRAM, or the like. Computer system 900 includes read-only memory (ROM) 904 which may be PROM, EPROM, EEPROM, or the like. RAM 903 and ROM 904 hold user and system data and programs, as is well known in the art.

Computer system 900 also includes input/output (I/O) adapter 905, communications adapter 911, user interface adapter 908, and display adapter 909. I/O adapter 905, user interface adapter 908, and/or communications adapter 911 may, in certain embodiments, enable a user to interact with computer system 900 in order to input information.

I/O adapter 905 connects to storage device(s) 906, such as one or more of hard drive, compact disc (CD) drive, floppy disk drive, tape drive, etc., to computer system 900. The storage devices are utilized in addition to RAM 903 for the memory requirements associated performing the scanning operations described herein. Communications adapter 911 is adapted to couple computer system 900 to network 912, which may enable information to be input to and/or output from system 900 via such network 912 (e.g., the Internet or other wide-area network, a local-area network, a public or private switched telephony network, a wireless network, any combination of the foregoing). User interface adapter 908 couples user input devices, such as keyboard 913, pointing device 907, and microphone 914 and/or output devices, such as speaker(s) 915 to computer system 900. Display adapter 909 is driven by CPU 901 or by graphical processing unit (GPU) 916 to control the display on display device 910 to, for example, for displaying scanning results to a user. GPU 916 may be any various number of processors dedicated to graphics processing and, as illustrated, may be made up of one or more individual graphical processors. GPU 916 processes the graphical instructions and transmits those instructions to display adapter 909. Display adapter 909 further transmits those instructions for transforming or manipulating the state of the various numbers of pixels used by display device 910 to visually present the desired information to a user. Such instructions include instructions for changing state from on to off, setting a particular color, intensity, duration, or the like. Each such instruction makes up the rendering instructions that control how and what is displayed on display device 910. Display adapter 909 further receives touch screen input from display device 910 through capacitive coupling and a grid of capacitive sensors within display device 910.

It shall be appreciated that the present disclosure is not limited to the architecture of system 900. For example, any suitable processor-based device having a capacitive touch screen may be utilized for implementing the scanning system described herein, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

In the preceding detailed description, numerous specific details were set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method comprising:
   substantially simultaneously receiving, by a device comprising a capacitive touch screen, a plurality of locations in response to at least one contact of an object on the capacitive touch screen, the capacitive touch screen comprising a touch panel and each of the plurality of locations corresponding with a position on the capacitive touch screen on the touch panel, each position corresponding with a contact between the capacitive touch screen and electrically conductive ink on the object;
   identifying at least one image based at least in part on the plurality of locations; and
   generating representative information based at least in part on the at least one Image.

2. The method of claim 1 wherein the representative information comprises data associated with a barcode and wherein generating representative information based at least in part on the at least one image comprises:
   determining that at least a portion of the at least one image corresponds to the barcode; and
   generating the data associated with the barcode based at least in part on the portion of the at least one image.

3. The method of claim 2 further comprising:
   sending, by the device, a request based at least in part on the data associated with the barcode, the request configured to cause a second device to send a response to the.

4. The method of claim 3 further comprising:
   receiving, by the device, a response from the second device, the response containing the information based at least in part on the request; generating a rendering based at least in part on the response; and
   displaying the rendering on a display associated with the device.

5. The method of claim 1 wherein the representative information comprises text and wherein generating representative information based at least in part on the at least one image comprises:
   determining that at least a portion of the at least one image corresponds to the text;
   determining one or more characters based at least in part on the portion of the at least one image; and
   generating the text based on the determined characters.

6. The method of claim 1 wherein the at least one contact of the object comprises a physical contact between the object and the capacitive touch screen of the device.

7. The method of claim 1 wherein receiving the plurality of locations includes completing a conductive connection via the object in response to user interaction.

8. The method of claim 1 wherein the object comprises a conductive area in electrical communication with at least a portion of the plurality of locations.

9. A method comprising:
   receiving, by a device comprising a capacitive touch screen, a plurality of locations in response to at least one contact of an object on the capacitive touch screen, the capacitive touch screen comprising a touch panel and each of the plurality of locations corresponding with a position on the capacitive touch screen on the touch panel, each position corresponding with a contact between the capacitive touch screen and electrically conductive ink on the object;
   determining at least one pattern based at least in part on the plurality of locations; and
   generating representative information based at least in part on the at least one pattern.

10. The method of claim 9 wherein the plurality of locations are received substantially simultaneously.

11. The method of claim 9 wherein receiving a plurality of locations comprises:
    receiving a plurality of variances in capacitance on at least a portion of the capacitive touch screen; and
    determining the plurality of locations based at least in part on the plurality of variances in capacitance.

12. The method of claim 9 wherein the representative information comprises a barcode.

13. The method of claim 9 wherein the representative information comprises text.

14. A non-transitory computer-readable medium comprising program code, comprising:
    program code for substantially simultaneously receiving a plurality of locations in response to at least one contact of an object on a capacitive touch screen, the capacitive touch screen comprising a touch panel and each of the plurality of locations corresponding with a position on the capacitive touch screen on the touch panel, each position corresponding with a contact between the capacitive touch screen and electrically conductive ink on the object;

program code for identifying at least one image based at least in part on the plurality of locations, the at least one image corresponding to a portion of the object comprising electrically conductive ink; and program code for generating representative information based at least in part on the at least one image.

15. The non-transitory computer-readable medium of claim 14 further comprising:

program code for determining at least one pattern based at least in part on the plurality of locations.

16. A system comprising:

a capacitive touch screen; and a processor in communication with the capacitive touch screen, the processor configured to:

substantially simultaneously receive a plurality of locations in response to at least one contact of an object on the capacitive touch screen, the capacitive touch screen comprising a touch panel and each of the plurality of locations corresponding with a position on the capacitive touch screen on the touch panel, each position corresponding with a contact between the capacitive touch screen and electrically conductive ink on the object;

identify at least one image based at least in part on the plurality of locations, the at least one image corresponding to a portion of the object comprising electrically conductive ink;

and generate representative information based at least in part on the at least one Image.

17. A device comprising:

a non-conductive substrate having a first side and a second side opposite the first side;

an electrically conductive ink, the electrically conductive ink applied to a first portion of the first side of the non-conductive substrate;

a conducting pad, the conducting pad connected to a second portion of the second side of the non-conductive substrate, the conducting pad configured to physically receive a contact from a finger;

a conducting trace disposed in the non-conductive substrate, the conducting trace coupling the electrically conductive ink and the conducting pad; and wherein at least a portion of the electrically conductive ink is configured to be electrically charged when the finger physically contacts the conducting pad.

18. The device of claim 17 wherein the conducting pad is electrically insulated from the first side of the non-conductive substrate.

19. The device of claim 17 wherein the portion of the electrically conductive ink is configured to represent a barcode.

20. The device of claim 17 wherein the portion of the electrically conductive ink is configured to represent text.

21. The device of claim 17 wherein the portion of the electrically conductive ink is at least substantially invisible to a human eye. is created between at least the finger and the electrically conductive ink when the finger physically contacts the conducting pad.

22. The device of claim 17 wherein an electrical circuit is created between at least the finger and the electrically conductive ink when the finger physically contacts the conducting pad.

23. The device of claim 22 wherein the portion of the electrically conductive ink is capable of physically being placed into contact with a capacitive touch screen of a second device and wherein the portion of the electrically conductive ink is capable of being scanned by the second device when the electrical circuit is created.

24. The device of claim 23 wherein the portion of the electrically conductive ink is configured to enable the second device to detect contacts between the portion of the electrically conductive ink and the capacitive touch screen.

25. The device of claim 24 wherein at least one electrical property associated with the finger is isolated from the capacitive touch screen of the second device.

* * * * *

UNITED STATES PATENT AND TRADEMARK OFFICE
CERTIFICATE OF CORRECTION

| | | |
|---|---|---|
| PATENT NO. | : 8,803,814 B2 | Page 1 of 1 |
| APPLICATION NO. | : 12/404072 | |
| DATED | : August 12, 2014 | |
| INVENTOR(S) | : Joe Andolina | |

It is certified that error appears in the above-identified patent and that said Letters Patent is hereby corrected as shown below:

In the Claims

Column 12, Claim 3, Line 6 after the word "the"

Insert --device--

Column 14, Claim 21, Lines 19-21

Delete "is created between at least the finger and the electrically conductive ink when the finger physically contacts the conducting pad."

Signed and Sealed this
Sixteenth Day of December, 2014

Michelle K. Lee
*Deputy Director of the United States Patent and Trademark Office*